March 22, 1960 W. GUSTAFSON ET AL 2,929,254
ROTARY EGG WASHER
Filed Aug. 28, 1957 4 Sheets-Sheet 3
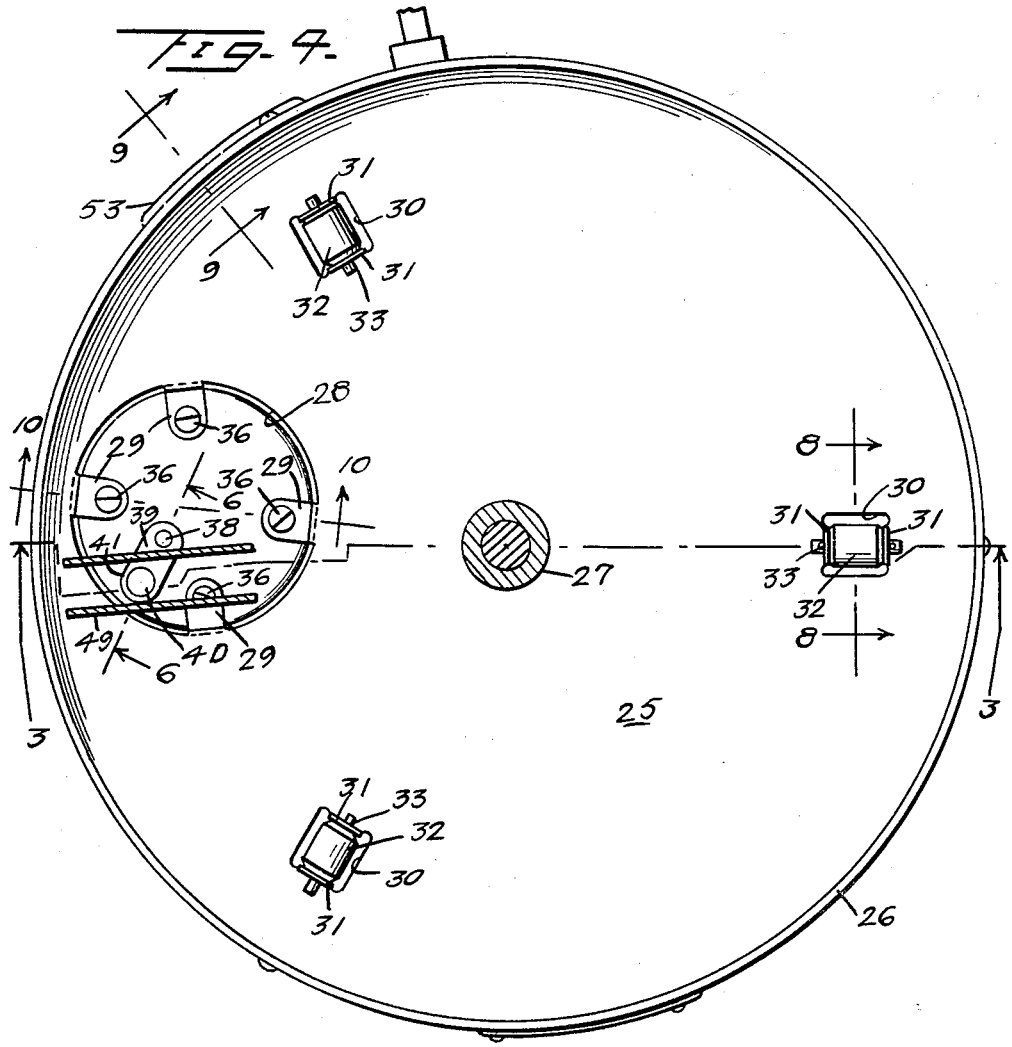
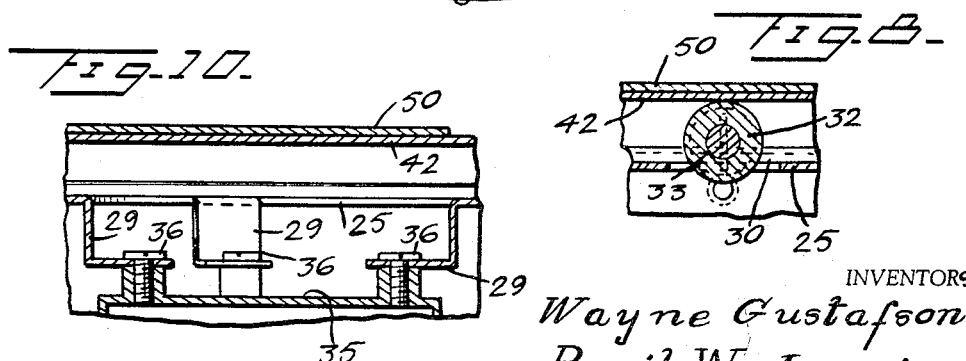
INVENTORS
Wayne Gustafson
Basil W. Leggin
BY Kimmel & Crowell
ATTORNEYS March 22, 1960 W. GUSTAFSON ET AL 2,929,254
ROTARY EGG WASHER
Filed Aug. 28, 1957 4 Sheets-Sheet 4
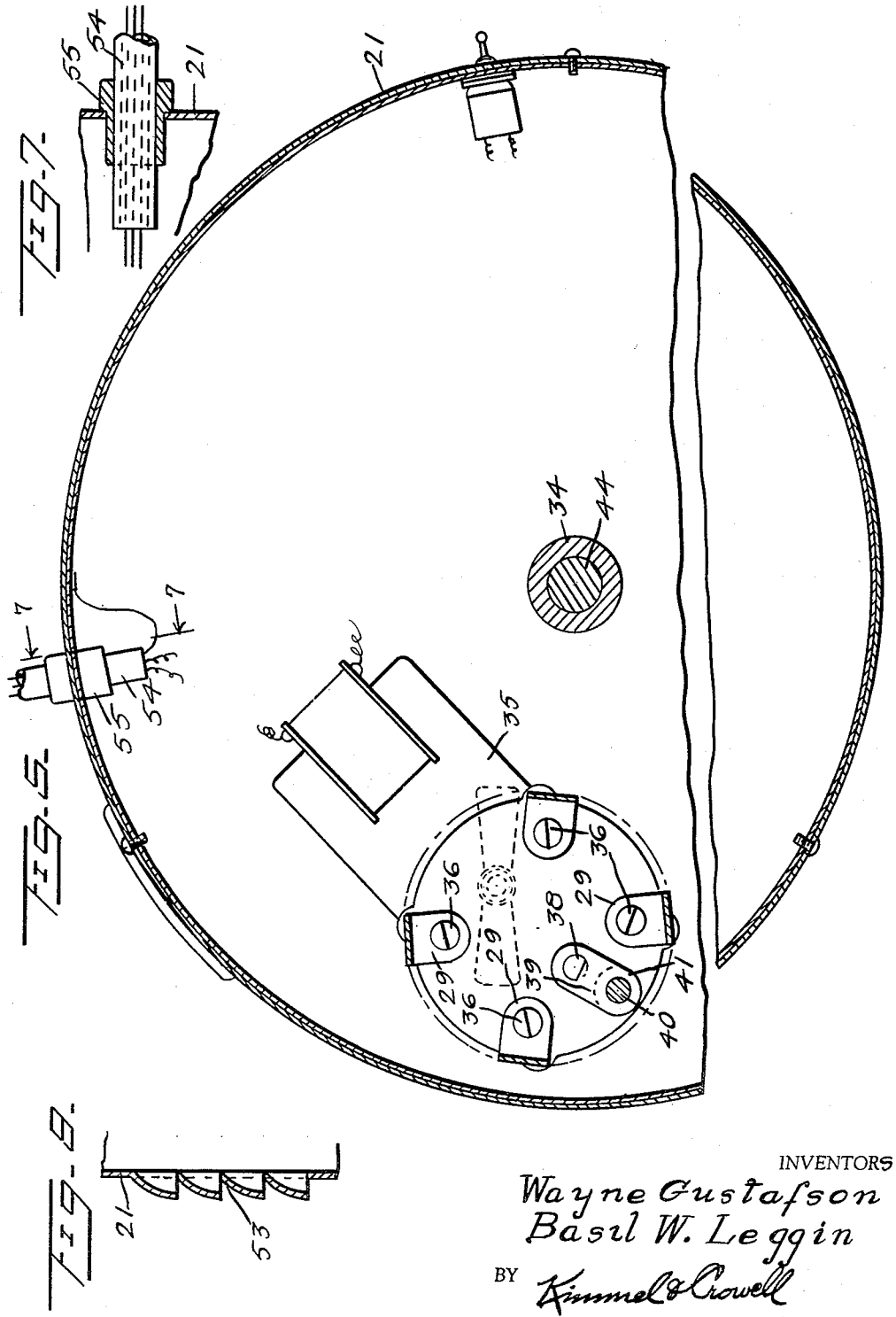
INVENTORS
Wayne Gustafson
Basil W. Leggin
BY Kimmel & Crowell
ATTORNEYS

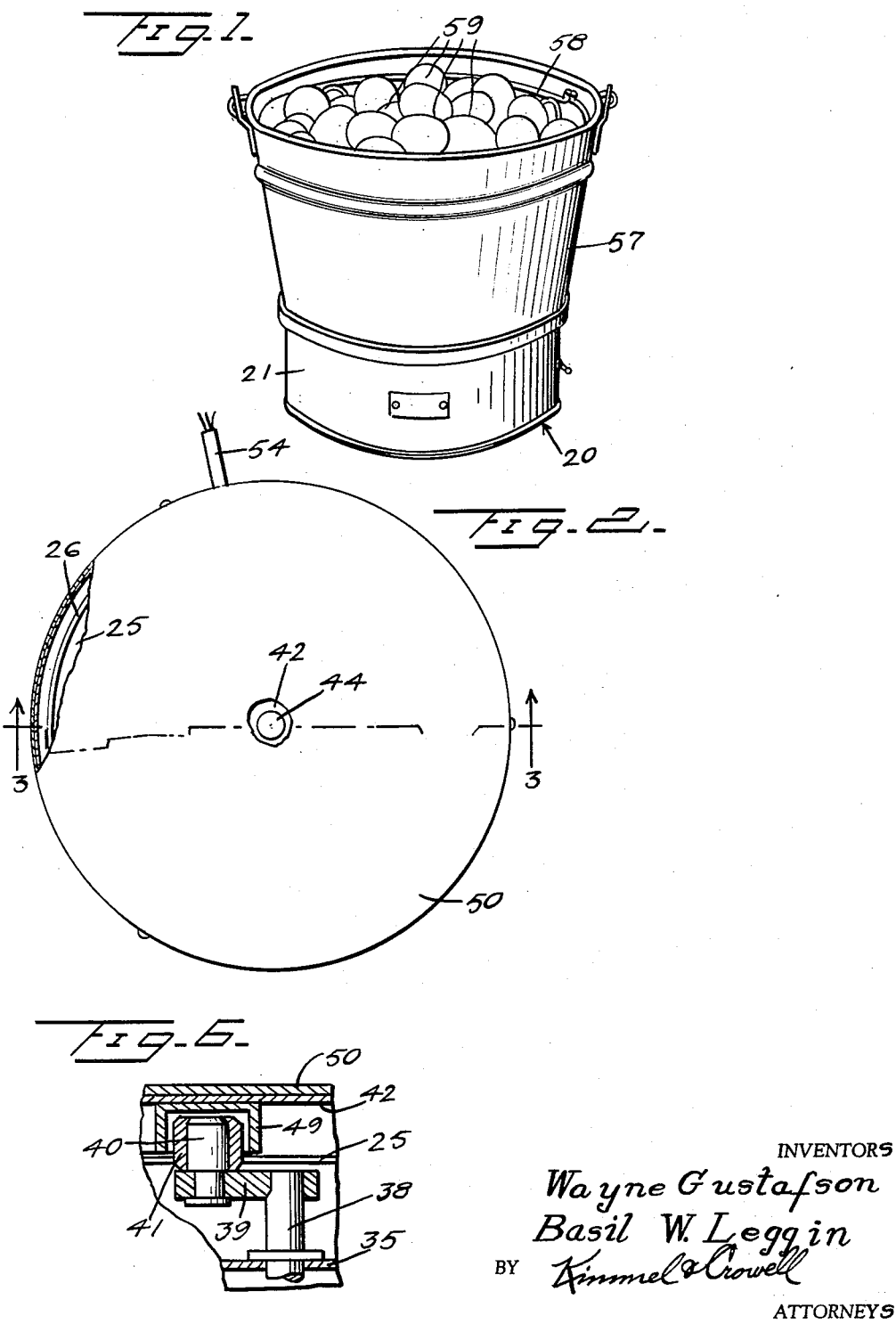

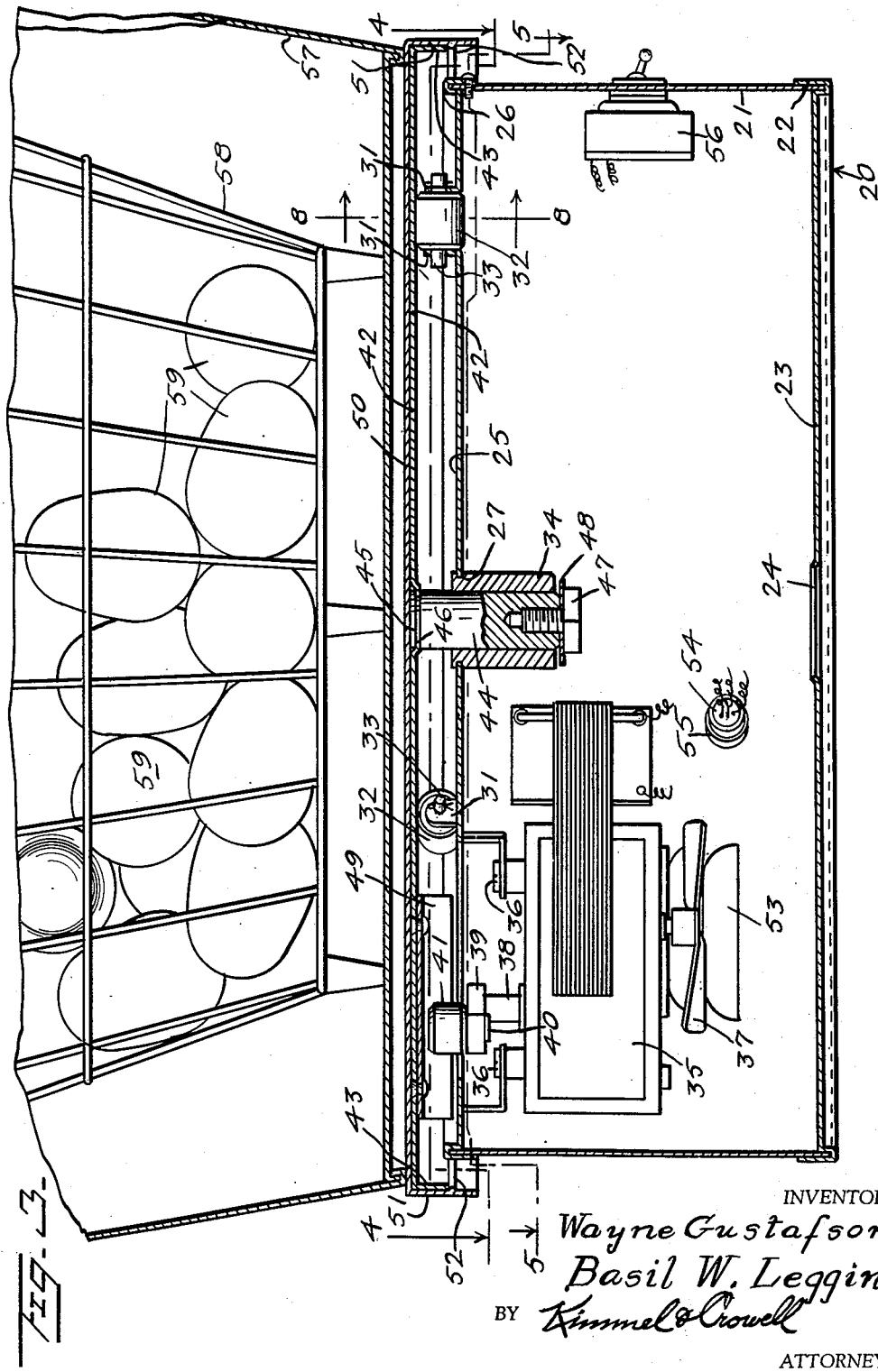

United States Patent Office 2,929,254
Patented Mar. 22, 1960

2,929,254

ROTARY EGG WASHER

Wayne Gustafson, Moorhead, and Basil W. Leggin, Winona, Minn., assignors to FM Engineering Company, Inc., Moorhead, Minn.

Application August 28, 1957, Serial No. 680,864

4 Claims. (Cl. 74—48)

The present invention relates to rotary egg washers, and more particularly to such devices wherein the egg is washed with a minimum of handling.

The primary object of the invention is to provide a rotary egg washer in which the eggs can be washed within their carrying basket without changing the eggs individually from one container to another.

Another object of the invention is to provide a rotary egg washer of the class described above which is sufficiently gentle in its action so that the eggs are not broken during the washing operation.

A further object of the invention is to provide an egg washing apparatus in which the egg is washed by gentle agitation immersed in an egg cleaning detergent.

A still further object of the invention is to provide an egg washing apparatus of the class described above which is inexpensive to manufacture, simple to use, and which is extremely sturdy under prolonged usage.

Other objects and advantages will become apparent in the following specification when considered in the light of the attached drawings, in which:

Figure 1 is a perspective view of the invention.

Figure 2 is a top plan view of the invention with the egg bucket and basket removed.

Figure 3 is an enlarged fragmentary vertical cross-section taken along the lines 3—3 of Figures 2 and 4, looking in the direction of the arrows, with the egg bucket and basket in position.

Figure 4 is a horizontal cross-section taken along the line 4—4 of Figure 3, looking in the direction of the arrows.

Figure 5 is a fragmentary horizontal cross-section taken along the line 5—5 of Figure 3, looking in the direction of the arrows.

Figure 6 is an enlarged fragmentary vertical cross-section taken along the line 6—6 of Figure 4, looking in the direction of the arrows.

Figure 7 is an enlarged fragmentary vertical cross-section taken along the line 7—7 of Figure 5, looking in the direction of the arrows.

Figure 8 is an enlarged fragmentary vertical cross-section taken along the lines 8—8 of Figures 3 and 4, looking in the direction of the arrows.

Figure 9 is an enlarged fragmentary vertical cross-section taken along the line 9—9 of Figure 4, looking in the direction of the arrows.

Figure 10 is an enlarged fragmentary vertical cross-section taken along the line 10—10 of Figure 4, looking in the direction of the arrows.

Referring now to the drawings in detail wherein like reference characters indicate like parts throughout the several figures, the reference numeral 20 indicates generally a washing machine for eggs constructed in accordance with the invention.

The egg washing machine 20 includes a cylindrical wall 21 having its lower end positioned in an annular channel 22 formed on the peripheral edge of a circular bottom wall 23. The bottom wall 23 is provided with a centrally located access opening 24 used in the assembly of the washing machine 20.

A circular top wall 25 is provided with an annular channel 26 extending about the peripheral edge thereof and engaging over the upper edge of the cylindrical wall 21. The top wall 25 and the bottom wall 23 are arranged in spaced parallel relation, and the top wall 25 has an axial opening 27 formed therein.

The top wall 25 is provided with a generally circular opening 28 adjacent one side edge thereof having a plurality of tongues 29 arranged thereabout in circumferentially spaced relation and bent into a depending L-shape. The top wall 25 is further provided with a plurality of generally rectangular openings 30 in circumferentially equispaced relation thereabout and having upstanding ears 31 integrally formed on the top wall 25 at opposite ends of each of the openings 30.

A roller 32 is positioned in each of the openings 30 and journalled on a pin 33 supported in the ears 31. The rollers 32 project above the top wall 25 and above the upper extent of the ears 31, as can be seen in Figure 8.

A tubular bushing 34 is staked into the opening 27 of the top wall 25 and depends axially therefrom. An electric gear reduction motor 35 is positioned on the tongues 29 by means of bolts 36.

The electric motor 35 has a cooling fan 37 arranged on the lower side thereof and has a drive shaft 38 extending upwardly therefrom within the limits of the opening 28. The upper end of the shaft 38 is provided with an offset crank arm 39 having one end secured thereto. The opposite end of the crank arm 39 has an upwardly extending journal pin 40 secured thereto. A roller 41 is rotatably carried on the journal pin 40, for reasons to be assigned.

A circular support wall 42 is arranged in spaced parallel relation above the top wall 25 and has an annular depending flange 43 formed on the peripheral edge thereof. The support wall 42 has a diameter slightly greater than the diameter of the top wall 25 and rests on the rollers 32, as can be best seen in Figure 3.

A shaft 44 is staked at 45 to an opening 46 in the center of the support wall 42 and depends therefrom extending through the tubular bushing 34. A cap screw 47 is threaded into the lower end of the shaft 44, and a washer 48 retains the shaft 44 in the bushing 34 to retain the support wall 42 in contact with the rollers 32. The support wall 42 is rotatably carried on the rollers 32 moving about the center of the shaft 44 revolving in the tubular bushing 34.

A short channel member 49 is secured in underlying relation to the support wall 42 with the roller 41 engaged between the opposite sides thereof. By referring to Figures 4 and 6, it can be readily seen that rotary movement of the shaft 38 will move the roller 41 in an arc which will oscillate the channel 49 and hence the support wall 42 about the center thereof.

A platform 50 of circular shape overlies the support wall 42 and has a depending flange 51 overlying the flange 43 and arranged in contacting relation therewith. The flange 51 is somewhat longer than the flange 43 and has an internal annular bead 52 engaged under the lower edge of the flange 43 to secure the platform 50 to the support wall 42.

The cylindrical side wall 21 is provided with ventilating louvers 53, as can be best seen in Figure 9, to prevent the mechanism of the egg washing machine 20 from becoming over heated.

Electric wiring 54 extends through the wall 21 and is protected by a grommet 55 of conventional construction. A single-throw single contact switch 56 is mounted on the cylindrical wall 21 and is wired to the electric motor 35 to control the supply of electricity thereto.

A galvanized bucket 57 is positioned centrally on the support platform 50 and is filled with a liquid egg washing detergent to a predetermined point. A mesh basket 58 having eggs 59 therein is positioned in the detergent in the galvanized bucket 57 and the electric switch 56 is operated to energize the motor 35. The relatively slow rotation of the shaft 38 gently oscillates the platform 50, galvanized bucket 57, and basket 58 to cause the eggs 59 to gently move within the basket 58 rubbing the dirt therefrom with the assistance of the detergent material in which the eggs are immersed. Dirt removed from the eggs 59 collects in the bottom of the galvanized bucket 57 below the bottom of the mesh basket 58 from whence it can be removed as desired.

Having thus described the preferred embodiment of the invention, it should be understood that numerous structural modifications and adaptations may be resorted to without departing from the scope of the appended claims.

What is claimed is:

1. An egg washing machine comprising a cylindrical housing, a horizontal top wall formed on said housing, a plurality of rollers journalled on said top wall with the axes of said rollers extending radially of said housing, a platform supported on said rollers, a stub shaft depending centrally from said platform, a bushing mounted centrally of said top wall journalling said stub shaft therein, a horizontal channel member secured in depending relation to said platform, an electric motor mounted in said housing, a crank arm rotatably driven by said electric motor and a roller journalled on the end of said crank arm engaging in said channel member whereby upon rotation of said motor said platform is rotatably oscillated.

2. A device as claimed in claim 1 wherein said platform includes a support wall having a depending flange integrally formed on the peripheral edge thereof, and an overlying wall having a depending flange encompassing the depending flange on said support wall.

3. A device as claimed in claim 2 wherein a bead is formed on the last named depending flange engaging under the lower edge of said first named depending flange to secure said last named depending flange to said first named depending flange.

4. An egg washing machine comprising a cylindrical housing, a horizontal top wall formed on said housing, said top wall having an aperture extending therethrough adjacent one point in the peripheral edge thereof, a bushing extending centrally through and depending from said top wall, a plurality of rollers journalled on said top wall with the axes of said rollers extending radially of said housing, a platform supported on said rollers, a stub shaft depending centrally from said platform and journalled in said bushing, a horizontal channel member secured in depending relation to said platform adjacent the peripheral edge thereof, an electric motor secured to said top wall in depending relation to said aperture, an offset crank arm having one end thereof secured to and rotatably driven by said motor, a journal pin secured to the other end of said crank arm and extending upwardly through said aperture, a roller journalled on said pin and engaging within said channel member.

References Cited in the file of this patent

UNITED STATES PATENTS

| | | |
|---|---|---|
| 232,486 | Gordon | Sept. 21, 1880 |
| 768,956 | Smithley | Aug. 30, 1904 |
| 1,386,451 | Brown | Aug. 2, 1921 |
| 2,104,283 | Webster | Jan. 3, 1938 |
| 2,156,541 | Misenhimer | May 2, 1939 |
| 2,520,889 | Paden | Aug. 29, 1950 |
| 2,725,062 | Vile | Nov. 29, 1955 |
| 2,757,908 | Broadwin | Aug. 7, 1956 |
| 2,793,010 | Menken | May 21, 1957 |
| 2,818,077 | Kitson | Dec. 31, 1957 |